(12) United States Patent
Cakmak et al.

(10) Patent No.: US 12,491,671 B2
(45) Date of Patent: Dec. 9, 2025

(54) METHOD OF MANUFACTURING A TWO-WHEELER FRAME

(71) Applicant: Plastic Innovation GmbH, Ottensheim (AT)

(72) Inventors: Umut Cakmak, Mödling (AT); Christian Wolfsberger, Ottensheim (AT)

(73) Assignee: PLASTIC INNOVATION GMBH, Ottensheim (AT)

( * ) Notice: Subject to any disclaimer, the term of this patent is extended or adjusted under 35 U.S.C. 154(b) by 0 days.

(21) Appl. No.: 17/909,736

(22) PCT Filed: Aug. 25, 2021

(86) PCT No.: PCT/EP2021/073474
§ 371 (c)(1),
(2) Date: Sep. 6, 2022

(87) PCT Pub. No.: WO2022/122194
PCT Pub. Date: Jun. 16, 2022

(65) Prior Publication Data
US 2023/0302694 A1 Sep. 28, 2023

(30) Foreign Application Priority Data
Dec. 10, 2020 (DE) .................. 102020133019.7

(51) Int. Cl.
*B29C 45/00* (2006.01)
*B29C 45/14* (2006.01)
(Continued)

(52) U.S. Cl.
CPC .... *B29C 45/0046* (2013.01); *B29C 45/14598* (2013.01); *B29C 45/14631* (2013.01);
(Continued)

(58) Field of Classification Search
CPC .......... B29C 45/0046; B29C 45/14598; B29C 45/14631; B29C 45/1711;
(Continued)

(56) References Cited

U.S. PATENT DOCUMENTS 5,997,799 A * 12/1999 Driessen ............. B29C 33/0055
264/572
6,019,935 A * 2/2000 Eckardt ............... B29C 45/1704
264/572
(Continued)

FOREIGN PATENT DOCUMENTS

CN 103552220 A 2/2014
CN 104552745 A * 4/2015
(Continued)

OTHER PUBLICATIONS

English translation of WO-2009112387-A1 (specification) by EPO. (Year: 2009).*
(Continued)

*Primary Examiner* — Xiao S Zhao
*Assistant Examiner* — Inja Song
(74) *Attorney, Agent, or Firm* — Christopher R. Carroll; The Small Patent Law Group LLC

(57) ABSTRACT

The invention relates to an injection molding method of manufacturing a two-wheeler frame in which a melt of a thermoplastic is injected into a cavity of an injection molding tool before a portion of the plastic melt is displaced from the cavity again by a subsequent fluid injection to form the inner hollow space of the tubular frame, with the fluid flowing upward in the course of the displacement process.

11 Claims, 4 Drawing Sheets

(51) Int. Cl.
  *B29C 45/17* (2006.01)
  *B29L 31/30* (2006.01)
(52) U.S. Cl.
  CPC .. *B29C 45/1711* (2013.01); *B29C 2045/1707* (2013.01); *B29C 2045/1713* (2013.01); *B29C 2045/1728* (2013.01); *B29C 2045/173* (2013.01); *B29L 2031/3091* (2013.01)
(58) Field of Classification Search
  CPC .... B29C 2045/1707; B29C 2045/1713; B29C 2045/1728; B29C 2045/173; B29C 2045/1726; B29C 45/14778; B29C 45/1704; B29C 45/1703
  See application file for complete search history.

(56) References Cited

U.S. PATENT DOCUMENTS

| | | | | |
|---|---|---|---|---|
| 6,666,999 | B1 * | 12/2003 | Orsen | B29C 45/1704 264/572 |
| 2005/0035571 | A1 | 2/2005 | Huck | |
| 2018/0186049 | A1 * | 7/2018 | Wolfsberger | B62K 19/16 |

FOREIGN PATENT DOCUMENTS

| | | | | |
|---|---|---|---|---|
| CN | 104589581 | A * | 5/2015 | ......... B29C 45/1706 |
| CN | 104589581 | A1 | 5/2015 | |
| DE | 19903682 | A1 | 8/2000 | |
| DE | 10114415 | A1 | 10/2002 | |
| DE | 60209505 | T5 | 11/2006 | |
| DE | 102015008561 | A1 | 1/2017 | |
| DE | 102016015538 | A1 | 6/2018 | |
| DE | 102017118826 | A1 | 2/2019 | |
| EP | 2265425 | A1 | 12/2010 | |
| EP | 3558622 | A | 10/2019 | |
| JP | 2016112813 | A * | 6/2016 | |
| KR | 10-2018-0124593 | A | 11/2018 | |
| WO | WO-2009112387 | A1 * | 9/2009 | ......... B29C 45/1711 |
| WO | WO-2018114155 | A1 * | 6/2018 | ............. B29C 45/14 |

OTHER PUBLICATIONS

English translation of WO-2018114155-A1 (specification) by EPO. (Year: 2018).*
English translation of WO-2018114155-A1 (claims) by EPO. (Year: 2018).*
English translation of JP-2016112813-A (specification) by EPO. (Year: 2016).*
English translation of CN-104589581-A by EPO. (Year: 2015).*
English translation of CN-104552745-A by EPO. (Year: 2015).*
A structure of a bike frame, available at https://i.pinimg.com/474x/ac/26/f6/ac26f6f8d9f7f93c97f665ec58368c23.jpg. (Year: 2025).*
Search Report for corresponding Application No. DE 102020 133 019.7 (5 pages).
Search Report and Written Opinion for corresponding Application No. PCT/EP2021/073474 (19 pages).
Hinse Christoph et al., "Wasserinjektionstechnik und ihre Simulation— eine Kombination für Effizienzsteigerung", Jul. 16, 2019 (Jul. 16, 2019), Abgerufen von: URL:https://www.konstruktionspraxis.vogel. de/wasserinjektionstechnik-und-ihre-simulation-eine-kombination-fuer-effizienzsteigerung-a-845199/ XP055860318.
Office Action mailed Mar. 11, 2025 for corresponding Japanese Patent Application No. 2022-552452. English translation provided. (19 pages).
Office Action mailed Aug. 8, 2025 for corresponding Chinese Patent Application No. 202180016792.X. English translation provided.

* cited by examiner

METHOD OF MANUFACTURING A TWO-WHEELER FRAME

BACKGROUND

Technical Field

The invention relates to a method of manufacturing a two-wheeler frame having at least one tubular frame component.

Discussion of Art

It is known from the prior art to produce a two-wheeler frame having at least one tubular frame component by an injection molding method in which a melt of a thermoplastic is first injected into a mold before a portion of the plastic melt is displaced from the mold again by a subsequent fluid injection to form the inner hollow space of the tubular frame component. Reference can, for example, be made to CN 103 552 220 A or DE 10 2015 008 561 A1 in this connection.

BRIEF DESCRIPTION

It is the object of the invention to optimize this method with a view to improve process efficiency and product quality.

Against this background, the invention relates to a method of manufacturing a two-wheeler frame having at least one tubular frame component, wherein the method comprises an injection molding method in which a melt of a thermoplastic is first injected into a cavity of an injection molding tool through at least one fluid injection point 1 before a portion of the plastic melt is displaced from the cavity again through at least one outlet by a subsequent fluid injection through at least one fluid injection point to form the inner hollow space of the tubular frame component.

Provision is made in accordance with the invention that the fluid injection point is disposed at the injection molding tool below the outlet for the displaced plastic melt so that fluid flows upward in the course of the displacement process.

Provided that a plurality of outlets for the displaced plastic melt are provided at the injection molding tool, all of these outlets are preferably arranged above the injection point. A plurality of injection points can also be provided to displace a plastic melt from different sections of the frame and one or more outlets can cooperate with each of the injection points in the course of the displacement of plastic from a specific frame region. Provision is preferably made in these cases that it applies to all the cooperating pairs of injection points and outlets that the injection points are arranged below the outlet.

The key idea of the invention is therefore an upward flowing of the fluid in the injection molding tool or in the core of the molded frame structure. The plastic melt is urged upwardly out of the cavity or out of the molded frame structure by gravity. The formation of fluid inclusions in the completed frame parts can be largely avoided by the selection of this direction of flow in practice.

The shape of the cavity and the positions of the outlet and of the fluid injection point at the injection molding tool are preferably such that the fluid continuously flows upward in the course of the displacement process. In other words, it is therefore preferred that not only the average direction of flow of the fluid faces upward, as is necessarily the case on an arrangement of the outlet above the fluid injection point, but also that the fluid in the injection molding tool or in the molded frame structure actually continuously flows upward and not horizontally or even downward at times.

The injection molding tool has suitable injection nozzles for the fluid at the injection points. The fluid can be a liquid, for example water, or a gas, for example air. The use of a liquid and in particular of water can be preferred in an embodiment due to the lack of compressibility.

The sequential injection of two fluids can be preferred in an embodiment. A gas, for example, first a compressed gas, such as compressed air and then a liquid such as water, for instance, can, for example, be injected sequentially. The liquid then pushes a gas bubble before it. An advantage of such a procedure can be that the presented gas can serve as an insulation layer between the hot plastic melt and the liquid.

Overflow cavities or, provided a mass back pressure is provided, hot channels can adjoin the outlets. In a variant of the method, possible overflow cavities can be separated after the injection molding and the expelling of the excess melt by a device separately provided at the injection molding tool for this purpose. The device can, for example, be an automatically travelable cutter or an automatically travelable blade.

Provision is preferably made within the framework of the method in accordance with the invention that the plastic injection point is also disposed below the outlet for the displaced plastic melt at the injection molding tool and is preferably disposed in the region of the fluid injection point. A rising of the melt in the cavity can also be advantageous for the plastic injection. The advantages in particular come into their own when the cavity is not fully filled with plastic before the start of the fluid injection, but rather the uppermost regions of the cavity are only filled with plastic material moving up by the displacement in the course of the displacement process. Either only a portion of the melt or the total melt of the thermoplastic can be injected into the cavity through this plastic injection point provided below the outlet at the injection molding tool.

Provision can be made in an embodiment, of the method that at least a portion of the melt of the thermoplastic is injected into the cavity through the outlet for the displaced plastic melt. The outlet thus simultaneously serves as a plastic injection point for the displaced plastic melt. The injection of at least a portion of the melt at this point remote from the fluid injection point can promote a uniform distribution of the melt in the cavity. In addition, the number of necessary ingresses and egresses in and out of the cavity is reduced.

The two-wheeler frame manufactured in the course of the invention can, in an embodiment, be a frame of a bicycle with or without electric motor assistance, for example a city bike, a sports bike such as a racing bike or a mountain bike, or a child's bicycle. In another embodiment, it can also be the frame of a motor-assisted bicycle, of a moped, or of a motorbike.

Established vehicle frames that are also manufactured in a preferred embodiment of the method in accordance with the invention comprise a steering tube, a down tube, a seat tube, two chain stays and two seat stays.

The steering tube is located at the very front of the frame. It is a short tube that is oriented approximately perpendicular and through which a head tube is pushed in the assembled state of the bicycle that connects the front wheel to the handlebars. The down tube adjoins the steering tube at the rear and connects it to the bottom bracket mount or, in the case of electric bicycles having a middle motor, to the motor mount that is typically disposed at the lowest point of the frame. The down tube runs obliquely downwardly starting from the steering tube and can be formed in a straight line or also slightly curved. The down tube is typically decisive for the stability of the frame so that it often has a comparatively large diameter and a comparatively great material strength. The seat tube runs approximately perpendicular upwardly starting from the region of the bottom bracket mount or motor mount. A saddle support is inserted at its upper end and the saddle is fastened thereto. The saddle can optionally also be fastened directly to the seat tube. In many cases, the frame has, in addition to the down pipe and the seat pipe, a crossbar that connects the steering tube to the upper region of the seat tube. The steering tube, the down tube, the seat tube and optionally the crossbar together form the so-called main frame.

The chain stays and the seat stays together form the rear structure of the frame that is triangular in a side view. The chain stays extend, starting from the region of the bottom bracket mount or motor mount horizontally to slightly rising toward the rear up to the so-called dropouts at which the rear wheel is mounted, while the seat stays connect the dropouts to the upper region of the main frame, as a rule to the upper region of the seat tube.

In a particularly preferred embodiment of the invention, the fluid in injected into the cavity in the region corresponding to the steering tube and the displaced plastic melt is urged out of the cavity through outlets that are disposed in the regions corresponding to the dropouts, the chain stays, or the upper end of the seat stays. Provision can therefore be made that the melt is urged out of the cavity in the region of the dropouts or that the melt is also urged through the seat stays at the same time and only exits the cavity at the upper end of the seat stays in the region of the seat tube.

The location of the molded frame in the injection molding tool in this embodiment preferably does not correspond to the location of the frame in the completed two-wheeler. The location of the molded frame is rather preferably such that the steering tube represents the lowest point and the rear ends of the chain stays represent the highest points.

The fluid channel separates in the region of the seat tube in these embodiments. A seat tube inserted into the cavity as a molded part can be the cause of this division. Provision can be made in an embodiment of the method that the fluid is conducted sequentially through the left and right chain stays and optionally furthermore the left and right seat stays.

The plastic melt can also be injected into the cavity in the region corresponding to the steering tube.

Provision can alternatively also be made that the fluid and/or the plastic is/are injected in the region of the lower end of the down tube or in the region of the bottom bracket mount or motor mount. The outlet or the outlets can be arranged in those regions of the cavity that correspond to the upper side of the seat tube or to that of the steering tube in this case. The location of the molded frame in the injection molding tool can correspond in these embodiments approximately to the location of the frame in the completed two-wheeler.

If the frame should have a mount for a rechargeable battery, for example in the region of the down tube, such as is frequently the case with frames for electric bicycles, these mounts are formed in the cavity itself or by a core so that the fluid channel produced by the displacement of the plastic melt leads past these mounts. In the case of a formation by a core, a core puller is preferably used to pull the core out of the cavity or out of the produced frame in a direction normal or transversely to the opening direction before the final opening of the halves of the injection molding tool.

To form the steering tube, in an embodiment of the invention, a hollow and preferably sleeve-like inserted part can be inserted into the region of the cavity corresponding to the steering tube and can be overmolded with the plastic melt. The sleeve can be produced from metal or from a non-metallic material.

It can be preferred in this connection that the hollow inserted part has an opening and is placed into the cavity such that the opening faces a region of the cavity that corresponds to a down tube or to a crossbar of the frame. In the case of a sleeve-like inserted part, the opening can be located in the radial peripheral jacket. In an embodiment, preferably in a location of the molded frame in the injection molding tool in which the steering tube represents the lowest point, provision can be made here that a fluid injection point is located in the region of the inserted sleeve and a flow path for the fluid leads through the hollow space of the sleeve and the opening in the inserted part into the down tube or also a crossbar up to outlets at the rear ends of the chain stays or seat stays. The fluid channel also separates here.

A plastic injection point can also be arranged in the region of the inserted sleeve. Plastic injectors and fluid injectors can, for example, be arranged at oppositely disposed axial ends of the sleeve or of the corresponding region of the cavity.

In an embodiment, in the course of the method, a seat tube can be inserted as an inserted part into the corresponding region of the cavity and can be at least partially overmolded with the plastic melt. The seat tube can be produced from metal or from a non-metallic material.

Provision can in particular be made in this connection that the seat tube has one or more openings in the radial peripheral jacket and is inserted into the cavity such that the opening or openings face/faces a region of regions of the cavity that corresponds or correspond to a down tube, a crossbar, chain stays, or seat stays of the frame. If the opening faces a region of the cavity that corresponds to a down tube or a crossbar of the frame, the hollow inner space of the seat tube can serve as a flow path for the plastic melt on the injection of the plastic melt and the fluid in the region of the steering tube. This flow path can be drawn further up to outlets at the rear ends of the stays via openings that correspond to the regions of the cavity facing the chain stays or seat stays.

In the event of a location of the molded frame in the injection molding tool in which the steering tube represents the lowest point, provision can also be made that a fluid injection point is located in the region of the inserted seat stay, preferably in the region close to the upper end of the inserted seat tube. A flow path for the fluid can then lead through the hollow space of the seat tube and a radial opening in the saddle support into the two seat stays up to outlets at the rear ends of the seat stays or at the rear ends of the chain stays coincident therewith. The fluid channel also separates here.

If, in an alternative embodiment of the method in accordance with the invention, the rear region of the down tube about the bottom bracket mount or the motor mount represents the lowest point of the molded frame in the injection molding tool, an injection of the plastic and/or of the fluid can also take place there. Any hollow spaces in the inserted parts, which is for example, in the sleeve or the seat tube, can complement the flow paths for the plastic melt and the fluid in this variant of the invention.

The outlets at the rear ends of the seat stays or chain stays can therefore define upwardly directed fluid paths both by fluid injection points in the region of the steering tube and also by fluid injection points in the region of the seat tube.

A plastic injection point can also be arranged in the region of the inserted seat tube.

In an embodiment, a section of the injection molding tool that defines that region of the cavity that corresponds to a crossbar of the frame can be decoupled or replaced to produce a frame without a crossbar or to implement different designs of the crossbar in the course of a method in accordance with the invention using the same injection molding tool. The corresponding section of the injection molding tool can in particular be formed by a replaceable tool insert. This formation of the injection molding tool makes it possible, for example, to produce both regular frames having a crossbar and step-throughs typical for women's bikes using the same injection molding tool.

Provision is made in a variant of the invention that fluid injectors project into the cavity and are partially overmolded with the plastic melt. Provision is preferably made in this case that the fluid injectors are equipped with a thermal insulating layer, for example a ceramic layer or Teflon layer.

Provision is made in a variant of the invention that the frame produced have a connection from the hot channel to the component cavity so that the melt can move from the hot channel into the cavity via a cold channel sub-distributor.

In the case of a plurality of fluid volume flows, they should be separated from one another by wall thicknesses of max. 4 mm.

Provision is made in a variant of the invention that a projectile is introduced into the cavity and is at least sectionally driven in front of the fluid by the fluid pressure on the expelling of the melt. A projectile can promote the reaching of constant residual wall thicknesses at the frame.

Polyamides, for example polyamide 12, polyamide 6, or polyamide 6.6, polyolefins, for example polypropylene or polyethylene, polyethersulfone, polyetherimide, polyetherketone, polyphenylsulfide, polyvinylchloride, polyester, acrylonitrile butadiene styrene (ABS), polycarbonate/acrylonitrile butadiene styrene (PC/ABS), or polycarbonate (PC) are suitable as plastic polyamides for use as part of the method in accordance with the invention. Polybutyleneterephthalate or polyethylene terephthalate ethylene are particularly suitable in an embodiment of the invention. The plastic melts can contain fillers such as fiber of glass or carbon to improve the mechanical properties. An insertion of carbon fiber mats or glass fiber mats into the cavity can also be provided in a variant of the invention.

BRIEF DESCRIPTION OF THE DRAWINGS

Further details and advantages of the invention result from the embodiments discussed in the following with reference to the Figures. There are shown in the Figures.

DETAILED DESCRIPTION

Figure 1A:
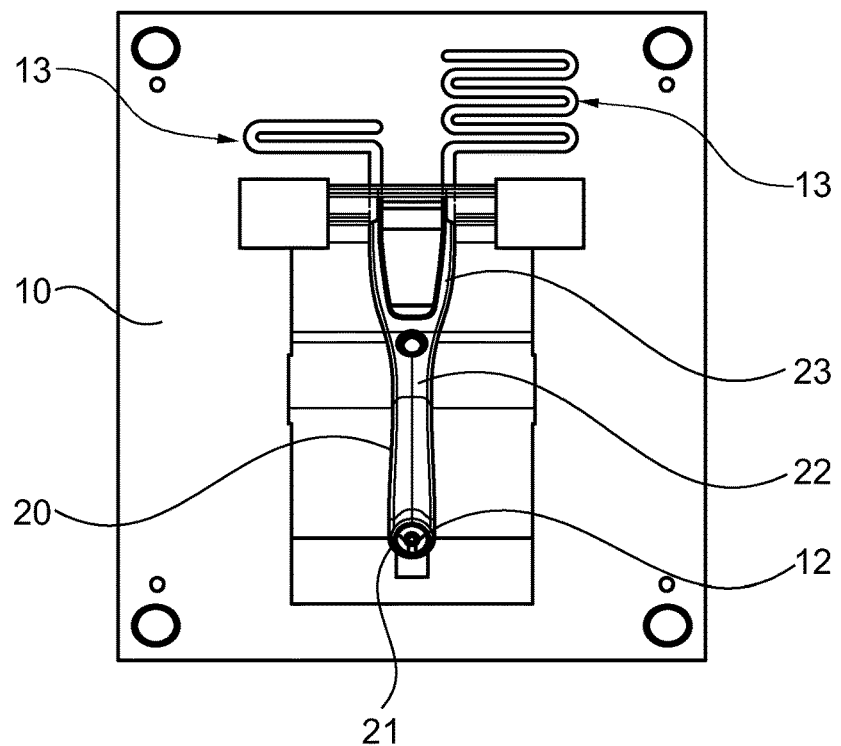
FIGS. 1a and 1b illustrate a plan view and a perspective view of a half of an injection molding tool having a partly shown molded frame.
Figure 1B:
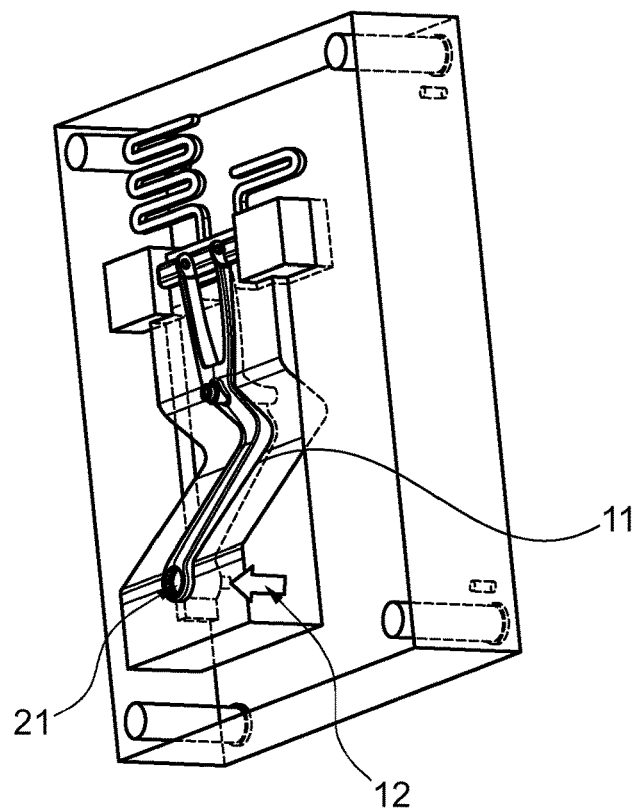

Views of a part of an injection molding tool 10 having a molded frame 20 that is only shown in part are shown in FIGS. 1a and 1b.

The regions of the molded frame 20 shown comprise a steering tube 21, a down tube 22, and two chain stays 23. The part of the injection molding tool 10 shown comprises a cavity 11 for demolding the corresponding regions of the frame 20, a fluid injector 12 that is arranged in the region of the cavity 11 corresponding to the steering tube 21, and two overflow cavities 13 that are arranged in the regions of the cavity 11 corresponding to the rear ends of the chain stays 23.

The positioning of the injection molding tool 10 in the course of the carrying out of the injection molding method of manufacturing the frame 20 is as it is shown in FIGS. 1a and 1b. The region of the cavity 11 corresponding to the steering tube 21 is therefore disposed at the lowest point and the regions of the cavity 11 corresponding to the rear ends of the chain stays 23 are disposed at the highest point. The fluid injector 12 is accordingly arranged below the overflow cavities 13.

In the course of the method of manufacturing the frame 20, a melt of a thermoplastic, for example of a polyamide, is first injected into the cavity 11 by a plastic injector not shown in FIG. 1a or 1b, but likewise disposed in the region of the cavity 11 corresponding to the steering tube 21 until said cavity 11 is partially filled, for example up to and into the transition region between the down tube 22 and the chain stays 23. A fluid, for example water, is subsequently pressed into the cavity 11 by the fluid injector 12. The fluid displaces the plastic core of the initially solid plastic bar that has been produced in the region of the cavity 11 corresponding to the down tube 22 while the regions of the bar directly adjacent to the surface of the cavity 11 have already cooled down and hardened so much that a displacement no longer takes place there. The displaced plastic material initially fills the regions of the cavity 11 still remaining empty, inter alia the regions corresponding to the chain stays 23. Once these regions have also been completely filled, the displaced plastic material escapes through corresponding outlets into the overflow cavities 13. The injection of the fluid is continued for so long until all the frame regions shown, that is the down tube 22 and chain stays 23, are tubular due to the displacement of the plastic core out of the initially bar-shaped elements. The fluid injection subsequently ends and the fluid can be removed, for example sucked, out of the core of the frame 20 produced. In variants of the invention, the fluid can also remain in the tube for a specific time period before its removal and can also optionally be circulated therein to assist the cooling and hardening of the tube walls of the produced frame. The completed frame 20 is then demolded.

Figure 2:
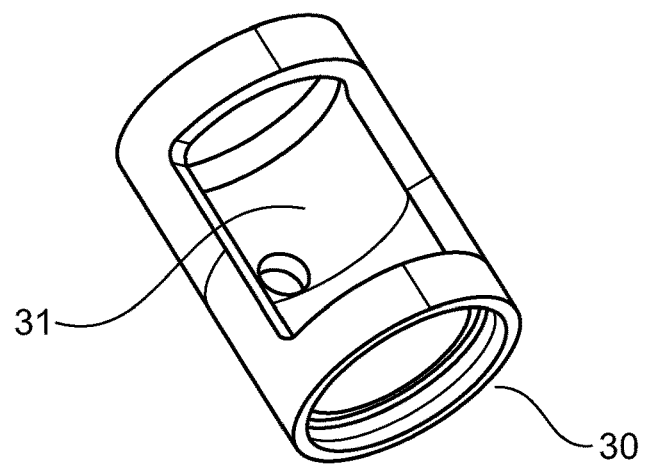
FIG. 2 illustrates a representation of an insertion sleeve for the steering tube that has radial openings.

A metal sleeve 30 as shown in FIG. 2 is inserted into the region of the cavity 11 corresponding to the steering tube 21 before the injection of the plastic melt. The metal sleeve 30 is overmolded with the plastic and reinforces the steering tube in the completed frame 20.

As can be recognized in FIG. 2, the sleeve 30 has a radial opening 31. The sleeve 30 is positioned in the cavity 11 in the course of the method such that the opening 31 faces the region of the cavity 11 that corresponds to the down tube 22 of the frame 20. The flow of the plastic melt and the flow of the fluid are thus not impeded by the sleeve 30.

Figure 3:
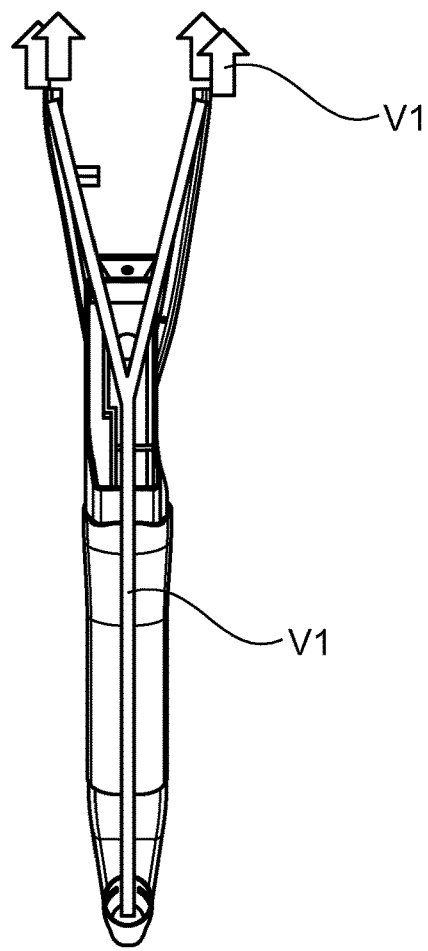
FIG. 3 illustrates a representation of the direction of flow of the fluid in the variant of the invention shown in FIG. 1.

The flow of the fluid in the course of the method management shown can be recognized with reference to the extent path V1 drawn in FIG. 3.

Figure 4:
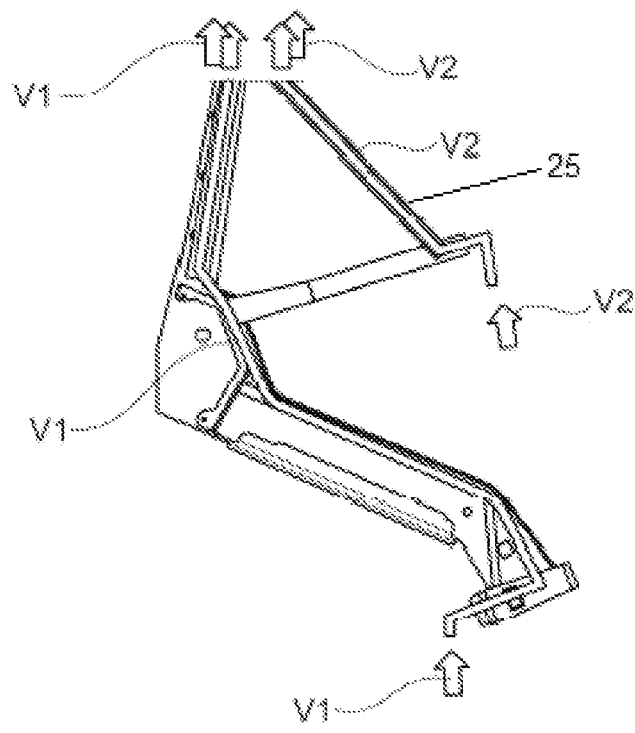
FIG. 4 illustrates a representation of the direction of flow of the fluid in an expanded version of the variant of the invention shown in FIG. 1.

An expansion of the just described method can be recognized in FIG. 4 in which a seat tube 24 composed of plastic is inserted as an inserted part into the regions of the cavity (not shown in FIG. 1a or 1b). Further injection nozzles for plastic and fluid are located at the upper end of the seat tube 24 and the seat tube has a radial opening that correspond to the regions of the cavity corresponding to seat stays 25 (not shown in FIG. 1a or 1b). Two separate fluid flows V1 and V2 result that are drawn in FIG. 4, with the fluid flow V1 corresponding to that one that has already been shown in the variant of FIG. 3. The seat tube 24 can also be completely overmolded with plastic in that a region of the cavity surrounds the plastic inserted part and plastic is injected into the gap between the walls of the cavity and the inserted part.

Figure 5:
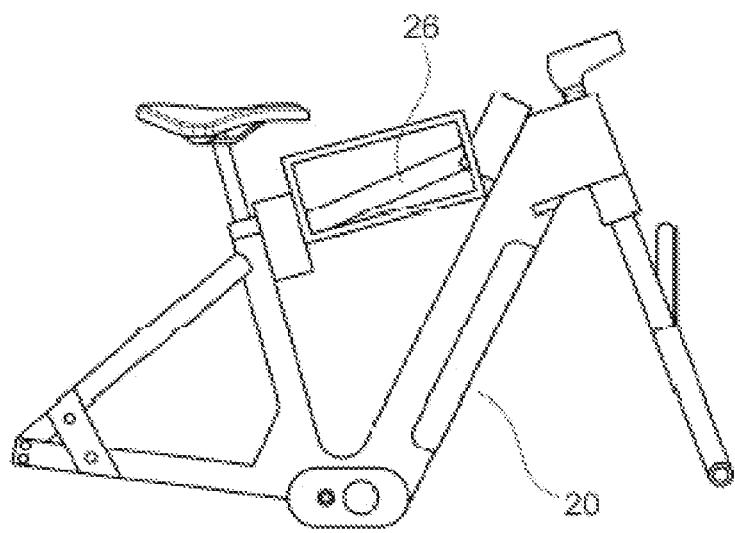
FIG. 5 illustrates a schematic representation for a possible decoupling of a region of the injection molding cavity corresponding to the crossbar of a bicycle frame.

FIG. 5 schematically illustrates the possibility of decoupling a region of the cavity 11 that corresponds to a crossbar 26 of the frame 20 in the course of a method in accordance with the invention by replaceable tool inserts. This variant of the invention makes it possible to produce both regular frames having a crossbar, which is, e.g., the diamond frames typical for sports bicycles and men's cycles, and step-throughs or wave frames typical with women's bicycles. The position of the crossbar can also be changed in this manner if the cavity has two regions corresponding to differently positioned crossbars of a frame.

Figure 6:
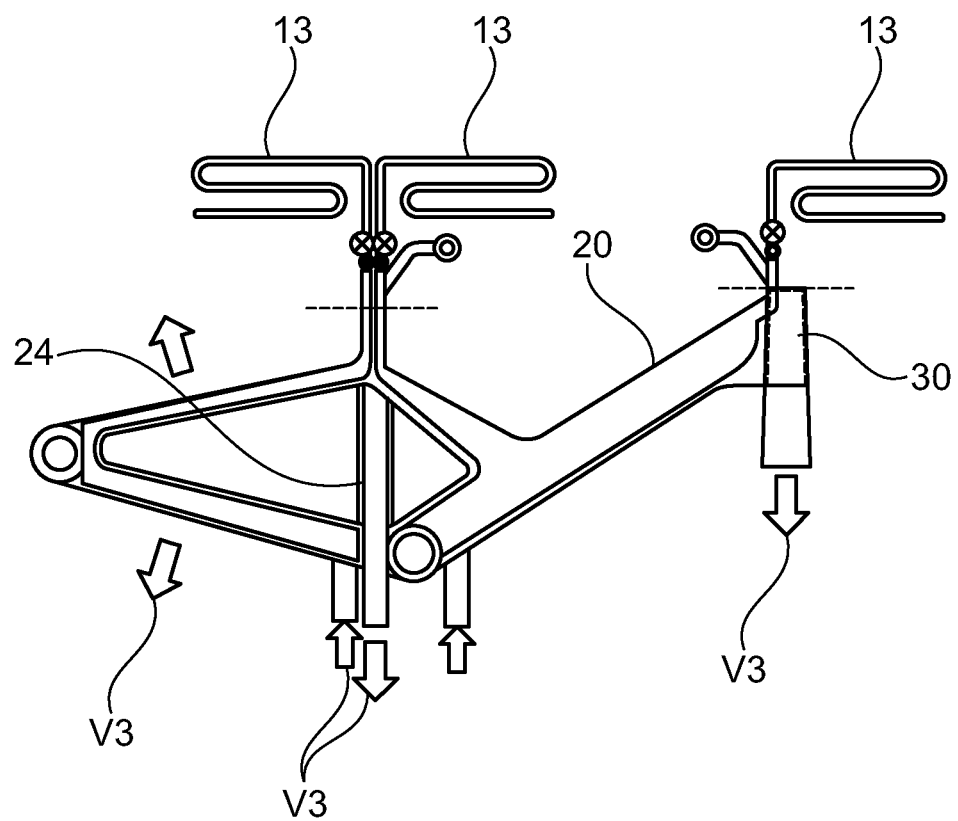
FIG. 6 illustrates a schematic representation for an alternative method management in the course of the invention.

Finally, FIG. 6 shows an alternative method management using alternative flow paths for the plastic melt and the fluid. In this variant of the method, the rear region of the down tube 22 represents the lowest point of the molded frame 20 in the injection molding tool 10. The injection of the plastic and of the fluid accordingly also takes place there. The hollow spaces in the inserted parts, that is in the sleeve 30 and the seat tube 24, complement the flow paths for the plastic melt and the fluid in this variant, as can be recognized with reference to the flow arrows V3.

The invention claimed is:

1. A method of manufacturing a two-wheeler frame having tubular frame components comprising at least a steering tube, a down tube, and chain stays, the method comprising:
    injecting a plastic melt of a thermoplastic into a cavity of an injection molding tool through at least one plastic injection point; and
    subsequently injecting a fluid into the cavity through at least two different fluid injection points disposed in different regions of the cavity corresponding to different tubular frame components to displace a portion of the plastic melt from the cavity and urge the portion of the plastic melt that is displaced out of the cavity through at least one outlet of the cavity, to form an inner hollow space of the tubular frame components;
    wherein each of the at least two different fluid injection points is disposed at the injection molding tool below the at least one outlet and a shape of the cavity, a position of the at least one outlet, and a position of each of the at least two different fluid injection points are such that the fluid flows only in an upward direction in the cavity from each of the at least two different fluid injection points to the at least one outlet.

2. The method in accordance with claim 1, wherein injecting the fluid comprises sequentially injecting a gas and a liquid.

3. The method in accordance with claim 1, wherein also the at least one plastic injection point is disposed below the at least one outlet.

4. The method in accordance with claim 1, wherein the at least one outlet is at least two outlets, wherein one of the at least two different fluid injection points is disposed in a region of the cavity corresponding to the steering tube of the two-wheeler frame, wherein the cavity comprises the at least two outlets through each of which a part of the portion of the plastic melt that is displaced is urged out of the cavity, and wherein two of the at least two outlets are disposed in regions of the cavity corresponding to dropouts of the chain stays of the two-wheeler frame.

5. The method in accordance with claim 1, wherein the two-wheeler frame that is manufactured additionally comprises a seat tube and seat stays, wherein one of the at least two different fluid injection points is disposed in a region of the cavity corresponding to the steering tube of the two-wheeler frame, and wherein the at least one outlet through which the portion of the plastic melt that is displaced is urged out of the cavity is disposed in a region of the cavity corresponding to an upper end of the seat stays of the two-wheeler frame.

6. The method in accordance with claim 1, wherein the two-wheeler frame that is manufactured additionally comprises a bottom bracket mount or a motor mount arranged around the down tube and the chain stays, and wherein one of the at least two different fluid injection points is disposed in a region of the cavity that corresponds to the bottom bracket mount or the motor mount of the two-wheeler frame.

7. The method in accordance with claim 1, wherein the method further comprises:
    inserting a sleeve as an inserted part into a region of the cavity corresponding to the steering tube of the two-wheeler frame, and wherein injecting the plastic melt overmolds the sleeve with the plastic melt.

8. The method in accordance with claim 7, wherein the sleeve has an opening and inserting the sleeve includes placing the sleeve into the cavity with the opening facing a region of the cavity that corresponds to the down tube of the two-wheeler frame.

9. The method in accordance with claim 1, wherein the two-wheeler frame that is manufactured additionally comprises a seat tube, and wherein the method further comprises:
    inserting the seat tube as an inserted part into a region of the cavity corresponding to the seat tube of the two-wheeler frame, and wherein injecting the plastic melt at least partially overmolds the seat tube with the plastic melt.

10. The method in accordance with claim 9, wherein the seat tube has one or more openings in a radial peripheral jacket and is inserted into the region of the cavity corresponding to the seat tube of the two-wheeler frame such that the one or more openings face one or more of a region of the cavity that corresponds to the down tube of the two-wheeler frame or regions of the cavity that correspond to the chain stays of the two-wheeler frame.

11. The method in accordance with claim 10, wherein one of the at least two different fluid injection points is located in the region of the cavity corresponding to the seat tube of the two-wheeler frame.

* * * * *